(No Model.) 2 Sheets—Sheet 2.
U. ROOT.
POWER TRANSMITTING MECHANISM.
No. 581,012. Patented Apr. 20, 1897.
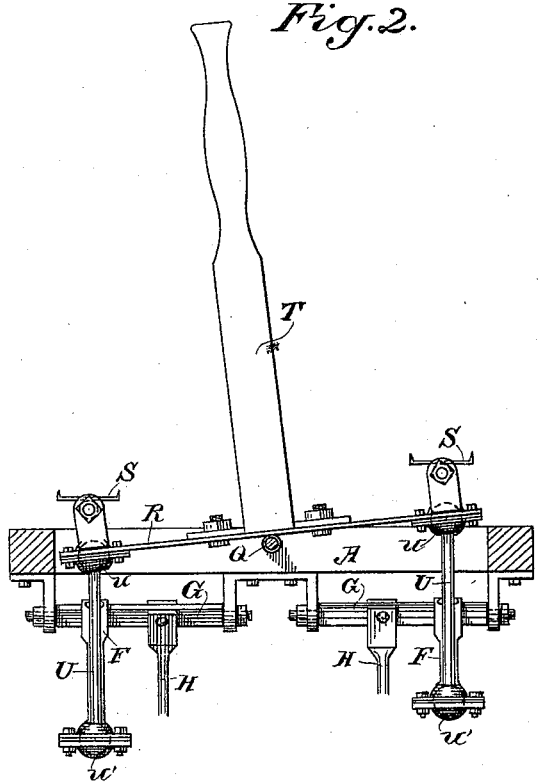

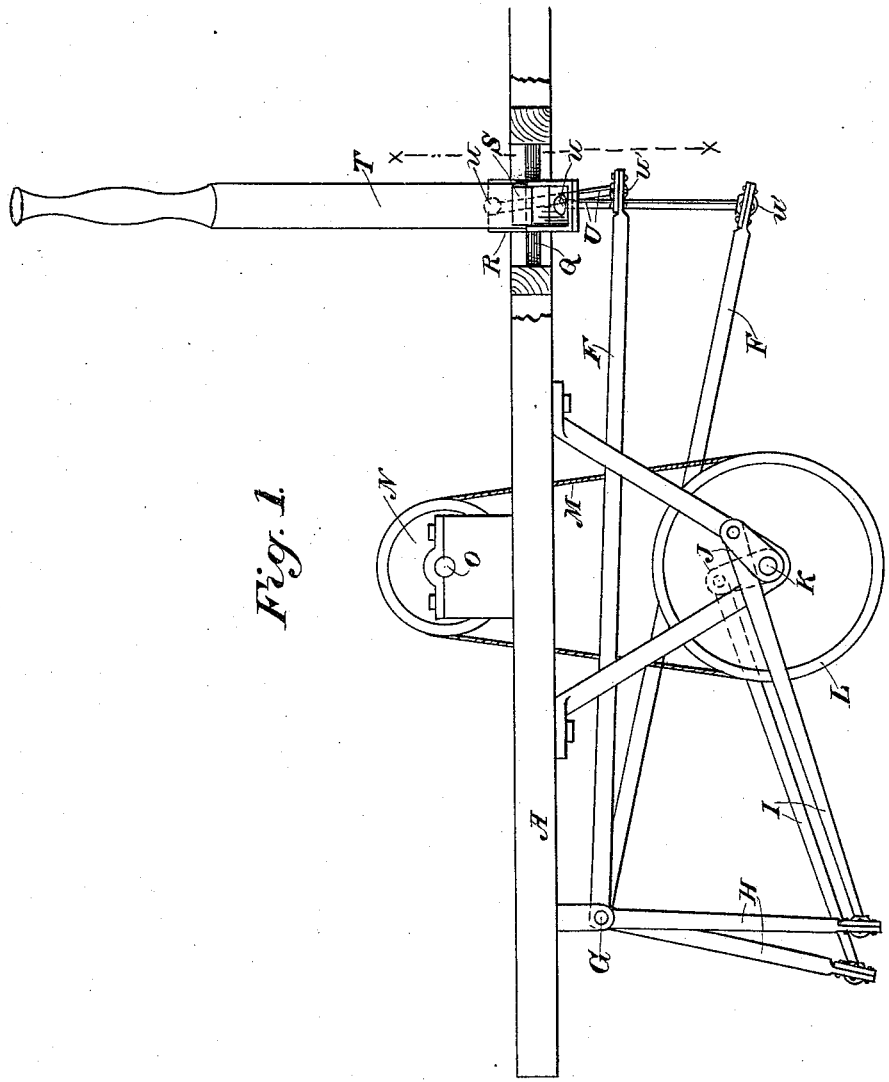

UNITED STATES PATENT OFFICE.

URIAH ROOT, OF COQUILLE, OREGON.

POWER-TRANSMITTING MECHANISM.

SPECIFICATION forming part of Letters Patent No. 581,012, dated April 20, 1897.

Application filed December 5, 1895. Serial No. 571,086. (No model.)

*To all whom it may concern:*

Be it known that I, URIAH ROOT, a citizen of the United States, residing in Coquille, county of Coos, State of Oregon, have invented an Improvement in Power-Transmitting Mechanisms; and I hereby declare the following to be a full, clear, and exact description of the same.

My invention relates to the general class of power-transmitting mechanisms; and it consists in the novel arrangement and combination of parts which I shall hereinafter fully describe and specifically claim.

Referring to the accompanying drawings, Figure 1 is a side elevation, partially broken away, of a power-transmitting mechanism embodying my invention. Fig. 2 is a cross-sectional view of the same on the line $x\ x$ of Fig. 1. Fig. 3 is a side view showing the interposition of the treadle or hand-power of Fig. 1 in the general mechanism.

A represents a suitable bed which supports the operative parts and in which rock-shafts G are appropriately mounted, and F are rods or levers secured to said shafts. From the rock-shafts extend downwardly the levers H, to the lower ends of which are flexibly joined the connecting-rods I, the other ends of which are properly connected with cranks J, set quartering with respect to each other upon a shaft K, which carries a pulley L, upon which a belt M extends to a pulley N on a shaft O, mounted on the frame above. In order to adapt this mechanism to be operated by treadle or hand-power, I prefer to use the following construction: In the end of the bed are pivotal points or centers Q, and upon these centers I pivot a lever R, which has at each end a suitable foot-rest or pedal S. These foot-rests or pedals are best made with a rocking or pivotal bearing, so as to hold the foot in the best manner to cause it to accommodate itself to the movement. Rising from the lever is a handle T. Secured under each end of the lever by a ball-and-socket joint $u$ is a connecting-link U, having at its end a ball-and-socket joint $u'$, which is adapted to be bolted to the end of the connecting-rod F. It will now be seen that by rocking the lever R, either by means of foot-power applied to the pedals or hand-power applied to the handle T, the connecting-rods F will be moved in the same manner as heretofore described and will transmit the power to the shaft O.

Having thus described my invention, what I claim as new, and desire to secure by Letters Patent, is—

1. A power-transmitting mechanism consisting of a centrally-pivoted lever and means for operating it, links depending from said lever, the swinging rods F, ball-and-socket connections between one end of the rods and links, a shaft having quartering cranks and connections between the cranks and the rods.

2. A power-transmitting mechanism consisting of a centrally-pivoted lever having upon its ends pedals to receive the feet and a central handle, links depending from said lever, the rods F, ball-and-socket connections between the rods and links, rock-shafts to which the rods are connected, levers connected with said rock-shafts, rods connected with the levers and a shaft having quartering cranks with which said rods are connected.

In witness whereof I have hereunto set my hand.

URIAH ROOT.

Witnesses:
R. D. SANFORD,
I. C. WILSON.